United States Patent [19]

Nakamoto et al.

[11] Patent Number: 4,668,751
[45] Date of Patent: May 26, 1987

[54] PLASTIC LENS

[75] Inventors: Hideo Nakamoto; Hiroshi Fukushima, both of Nagoya, Japan

[73] Assignee: Mitsubishi Rayon Co., Ltd., Tokyo, Japan

[21] Appl. No.: 883,149

[22] Filed: Jul. 8, 1986

[30] Foreign Application Priority Data

Jul. 19, 1985 [JP] Japan ................................. 60-159747

[51] Int. Cl.$^4$ .......................... C08F 18/24; C08F 22/26
[52] U.S. Cl. ..................................... 526/314; 526/322; 526/323
[58] Field of Search ........................ 526/322, 323, 314

[56] References Cited

U.S. PATENT DOCUMENTS

| | | | |
|---|---|---|---|
| 2,401,581 | 6/1946 | Muskat et al. | 526/314 |
| 2,445,535 | 7/1948 | Parsons et al. | 526/314 |
| 2,514,354 | 7/1950 | Adelson et al. | 526/314 |
| 2,548,141 | 4/1951 | Bralley | 526/314 |
| 2,910,456 | 10/1959 | Gooreynd et al. | 526/314 |
| 3,987,067 | 10/1976 | Morozowick | 560/50 |
| 4,366,171 | 12/1982 | Resnick | 560/141 |
| 4,412,050 | 10/1983 | Mehta | 526/314 |
| 4,464,303 | 8/1984 | Goel | 260/410.5 |
| 4,521,577 | 6/1985 | Romano et al. | 526/314 |
| 4,528,351 | 7/1985 | Tarumi et al. | 526/314 |
| 4,542,201 | 9/1985 | Kanemura et al. | 526/314 |
| 4,602,075 | 7/1986 | Kida et al. | 526/314 |

FOREIGN PATENT DOCUMENTS

| | | | |
|---|---|---|---|
| 58-153901 | 9/1983 | Japan | 526/314 |
| 58-217511 | 12/1983 | Japan | 526/322 |
| 2089523 | 6/1982 | United Kingdom | 526/292.5 |

*Primary Examiner*—Joseph L. Schofer
*Assistant Examiner*—N. Sarofim
*Attorney, Agent, or Firm*—Brumbaugh, Graves, Donohue & Raymond

[57] ABSTRACT

A plastic lens which comprises a polymer (A) containing as major component at least one radicalpolymerizable biphenyl compound represented by the general formula [I]:

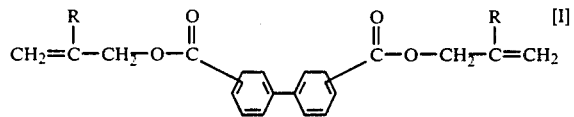

wherein each of R's represents a hydrogen atom or methyl group, has a high refractive index of not less than 1.55 and is excellent in transparency, processability, impact resistance, and dyeability.

4 Claims, No Drawings

PLASTIC LENS

BACKGROUND OF THE INVENTION

1. FIELD OF THE INVENTION

This invention relates to plastic lens having a high refractive index of not less than 1.55 and excellent properties in visible light transmission, processability, impact resistance, and dyeability.

2. DESCRIPTION OF THE PRIOR ART

Plastic lenses have become widely used in optical instruments, since they are lighter in weight, less fragile and more readily colored in comparison with inorganic glass lenses. Especially, in the case of eyeglass lenses, light-weight lenses are desirable, because the total weight of a pair of lenses is important from both physiologic and optical viewpoints. This is one of the main reasons for the recent widespreading tendency of plastic lenses. The leading resin used for eyeglass lenses is a polymer of diethylene glycol bis (allylcarbonate) (commonly called CR-39, Trademark for PPG Industries Co.). Since the specific gravity of the above polymer (1.32) is smaller than that of inorganic glass lenses (2.54), it is possible to reduce to a great extent the weight of lenses when this polymer is used. The above polymer, however, has a refractive index of 1.49 to 1.50 which is smaller than that ($n_D = 1.52$) of inorganic glass lenses. As a consequence, it is necessary to increase the central thickness, peripheral thickness and curvature of the lenses made of this polymer, as compared with inorganic glass lenses. Accordingly, development of a plastic lens having a higher refractive index has been eagerly awaited.

Polycarbonate ($n_D = 1.58$) and polystyrene ($n_D = 1.60$) are known popularly as polymers having high refractive indices. Since both of these polymers are linear and thermoplastic, they are not suitable for cast-polymerization method and hence unfit for production of articles of varied types, for example, production of eyeglass lenses. Moreover, the use of these polymers in optical field is limited to comparatively small areas owing to their disadvantages such as unsatisfactory grinding processability, low scratch resistance due to insufficient surface hardness, low resistance to organic solvents, and low heat resistance.

The proposed methods for providing three-dimensionally crosslinked plastic lens materials having high refractive indices include those which employ as major constituents (1) diacrylate or dimethacrylate derived from bisphenol-A [Japanese patent application "Kokai" (Laid-open) No. 13747/80], (2) diacrylate or dimethacrylate derived from halogenated bisphenol-A [Japanese patent application "Kokai" (Laid-open) No. 104,901/82], (3) a combination of a halogenated styrene monomer and a polyfunctional methacrylate [Japanese patent application "Kokai" (Laid-open) Nos. 104,101/82, 28,118/82, and 28,116/82], and (4) a diallyl phthalate monomer [Japanese patent application "Kokai" (Laid-open) Nos. 212,401/82 and 15,513/83].

However, the method (1) provides with difficulty three-dimensionally crosslinked plastics having a refractive index of not less than 1.55. The methods (2), (3) and (4) provide three-dimensionally crosslinked plastics having a high refractive index of not less than 1.60, but these plastics have faults of their easy discoloration and unsatisfactory weatherability. The plastics obtained by the method (4) have not only the fault of discoloration but also a low transmittance. In general, methods using compounds containing a (meth)acryloyl group and styrene monomers are disadvantageous in that said compounds contain polymerization inhibitors and are difficult to alleviate discoloration of the cured products caused by said inhibitors during the castpolymerization.

SUMMARY OF THE INVENTION

The purpose of the present invention is to provide three-dimentionally crosslinked plastic lenses having a high refractive index without any aforementioned defects. The problems mentioned hereinafter can be solved by using a polymer comprising as major component at least one radical-polymerizable biphenyl compound represented by the general formula [I]:

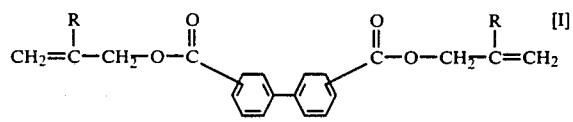

wherein each of R's represents a hydrogen atom or methyl group, has a high refractive index and is satisfactory in visible light transmission, grinding processability, and impact resistance. On the basis of this finding, the present invention has been accomplished.

DETAILED DESCRIPTION OF THE INVENTION

Concrete examples of the radical-polymerizable biphenyl compound of the general formula [I]used in this invention include biphenyl 2,2'-diallyl ester, biphenyl 2,2'-dimethallyl ester, biphenyl 3,3'-diallyl ester, biphenyl 3,3'-dimethallyl ester, biphenyl 4,4'-diallyl ester, biphenyl 4,4'-dimethallyl ester. These monomers can be used alone or as a mixture thereof. Said monomers have a number of features. First, they can be purified by distillation and can be stored for a long term without addition of a polymerization inhibitor such as hydroquinone or the like. Second, their polymerization shrinkage is 7.8% which is considerably smaller than that (about 14%) of diethylene glycol Bis(allylcarbonate) (hereinafter referred to as CR-39). Third, the specific gravity of their cured products is 1.24 which is considerably smaller than that (1.32) of cured product of CR-39. These features are very advantageous for production of optical lenses. The first feature enables the monomers to provide lens materials excellent in visible light transmission and free of discoloration. The second feature makes it possible to provide more precisely molded articles by cast polymerization than the case with CR-39, namely, to produce lenses of complicated shape in high production yield. The third feature enable the monomers to give lenses lighter in weight than those produced from CR-39.

The plastic lenses according to the present invention can be produced by polymerizing one of or a mixture of the biphenyl diallyl esters and/or biphenyl dimethallyl esters represented by the above general formula [I], in a mold. It is also possible to copolymerize the above-mentioned monomers with other monomers in order to further improve the performance characteristics. Concrete examples of the comonomers include diethylene glycol bis(allylcarbonate), diallyl o-phthalate, diallyl isophthalate, diallyl terephthalate, dimethallyl o-phthalate, dimethallyl isophthalate, dimethallyl terephthalate, phenyl (meth)acrylate, benzyl (meth)acrylate, phenoxyethyl (meth)acrylate, styrene, vinyltoluene, halogenated styrene, etc. Among them, monomers selected from the group (II) consisting of diethylene glycol bis(allylcarbonate) and dimethallyl phthalate are especially suitable for improving the characteristics of the lens materials.

When diethylene glycol bis(allylcarbonate) is copolymerized, the resulting lens has further improved impact resistance and dyeability though it has a somewhat lowered refractive index.

When dimethallyl phthalate is copolymerized, the dyeability becomes excellent, generation of heat of polymerization can be depressed, the moldability is improved, and a lens excellent in optical properties can be obtained.

The term "dimethallyl phthalate" as herein used, means dimethallyl o-phthalate, dimethallyl isophthalate, or dimethallyl terephthalate.

When these monomers are copolymerized, it is desirable to mix 60 to 90% by weight of at least one biphenyl compound represented by the above general formula [I] and 40 to 10% by weight of at least one monomer selected from the group [II], and subject the resulting mixture to cast polymerization. When the comonomer is used in an amount of more than 40% by weight, the resulting lens has a lowered refractive index, and in the case, when the comonomer is dimethallyl phthalate, the impact resistance is also lowered. When the amount of the comonomer is less than 10% by weight, the dyeability of the lens is lowered and thus the copolymerization does not have the effect described above.

The radical polymerization initiator used in practicing this invention is not critical and there can be used well-known organic peroxides such as benzoyl peroxide, diisopropyl peroxydicarbonate, tert-butyl peroxyisobutyrate, 1,1-di-tert-butylperoxy-3,3,5-trimethyl cyclohexane, bis(4-tert-butylcyclohexyl) peroxydicarbonate and the like; and azo compounds such as azobisisobutyronitrile and the like. The radical polymerization initiator is used preferably in an amount in the range of from 0.1 to 5 parts by weight per 100 parts by weight of the radicalpolymerizable biphenyl compound or the sum of said biphenyl compound and the comonomer.

This invention is concretely illustrated with reference to the following examples, in which all parts are by weight.

EXAMPLE 1

In 100 parts of biphenyl 2,2'-diallyl ester having a refractive index of 1.5678 at 20° C. synthesized from allyl chloride and potassium biphenyl-2,2'-dicarboxylate was dissolved 3 parts of diisopropyl peroxydicarbonate. The resulting mixture was poured into a mold composed of glass members for molding a lens of 65 mm in diameter and a polyethylene gasket. The filled mold was held in a hot blast stove at 40° C. for 20 hours, then at 80° C. for 4 hours, and finally at 100° C. for 4 hours. Then, the polymer thus obtained was taken out of the mold and its refractive index, visible light transmission, pencil hardness, grinding processability, and dyeability were measured. The results obtained were as shown in Table 1. The polymer obtained was in the form of colorless, transparent lens having a refractive index of 1.603. The refractive index was measured by means of Abbe refractometer and other performance characteristics were evaluated in the following manner.

Processability : The molded lenses were ground by means of a grinding machine designed to process eyeglass lenses. Samples bearing smooth ground surfaces were judged acceptable and market by circles (0).

Impact strength : Lens having a thickness at its center of 2 mm was measured according to FDA standard.

Dyeability : A suspension of 1.5 g of Sumikaron Blue E-FBL (Product of Sumitomo Chemical Co.) in 1 liter of water was used as dyeing bath. The cast lenses were dipped in the bath at 80° C. for 5 minutes. The polymer was rated as eligible when the dyeability was equivalent to that of a polymer of CR-39 alone.

The rating (mark) shown in the Tables was as follows:

O Eligible

Δ Inferior to some degrees

X Defective

EXAMPLE 2

A lens was produced in the same manner as in Example 1, except that biphenyl 2,2'-dimethallyl ester was used in place of biphenyl 2,2'-diallyl ester. The results obtained are shown in Table 1.

EXAMPLE 3

A lens was produced in the same manner as in Example 1, except that biphenyl 3,3'-diallyl ester was used in place of biphenyl 2,2'-diallyl ester. The results obtained are shown in Table 1.

EXAMPLE 4

A lens was obtained by cast-polymerizing a mixture of 60 parts of biphenyl 2,2'-diallyl ester, 40 parts of diethylene glycol bis(allyldicarbonate) and 3 parts of diisopropyl peroxydicarbonate in the same manner as in Example 1. The performance characteristics of the lens are shown in Table 1.

EXAMPLE 5

A lens was produced by carrying out cast polymerization in the same manner as in Example 4, except that the composition of the mixture of monomers was changed to 80 parts of biphenyl 2,2'-diallyl ester and 20 parts of diethylene glycol Bis(allylcarbonate). The performance characteristics of the lens are shown in Table 1.

EXAMPLE 6

A lens was produced in the same manner as in Example 4, except that dimethallyl o-phthalate was used in place of diethylene glycol bis(allylcarbonate). The performance characteristics of the lens are shown in Table 1.

EXAMPLE 7

A lens was produced in the same manner as in Example 4, except that the composition of the mixture of monomers was changed to 80 parts of biphenyl 2,2'-diallyl ester and 20 parts of dimethallyl o-phthalate.

EXAMPLE 8

A lens was produced in the same manner as in Example 4, except that the composition of the mixture of monomers was changed to 80 parts of biphenyl 2,2'-diallyl ester and 20 parts of dimethallyl isophthalate.

EXAMPLE 9

A lens was produced in the same manner as in Example 4, except that benzyl methacrylate was used in place of diethylene glycol bis(allylcarbonate). The performance characteristics of the lens are shown in Table 1.

TABLE 1

| Example No. | Refractive index | Hardness | Color | Visible light transmission | Grinding processability | Dyeability |
|---|---|---|---|---|---|---|
| 1 | 1.603 | 5H | Colorless | 90 | O | Δ |
| 2 | 1.601 | 4H | Colorless | 91 | O | Δ |
| 3 | 1.604 | 5H | Colorless | 90 | O | Δ |
| 4 | 1.562 | 4H | Colorless | 91 | O | O |
| 5 | 1.583 | 5H | Colorless | 90 | O | O |
| 6 | 1.536 | 4H | Colorless | 91 | O | Δ~O |
| 7 | 1.593 | 5H | Colorless | 91 | O | O |
| 8 | 1.592 | 5H | Colorless | 90 | O | O |
| 9 | 1.584 | 4H | Yellow | 88 | O | Δ |

COMPARATIVE EXAMPLE 1

A lens was produced in the same manner as in Example 1, except that CR-39 was used in place of biphenyl 2,2'-diallyl ester. The performance characteristics of the lens are shown in Table 2.

COMPARATIVE EXAMPLE 2

A lens was produced in the same manner as in Example 1, except that 2,2-bis(4-methacryloyloxyethoxyphenyl)propane was used in place of biphenyl 2,2'-diallyl ester. The performance characteristics of the lens are shown in Table 2.

COMPARATIVE EXAMPLE 3

A lens was produced in the same manner as in Example 4, except that 2,2-bis[3,5-dibromo-4-(2-methacryloyloxyethoxy)phenyl]propane was used in place of biphenyl 2,2'-diallyl ester. The performance characteristics of the lens are shown in Table 2.

TABLE 2

| Comparative Example No. | Refractive index | Hardness | Color | Visible light transmission | Grinding processability | Dyeability |
|---|---|---|---|---|---|---|
| 1 | 1.500 | 2H | Colorless | 91 | O | O |
| 2 | 1.549 | 3H | Yellow | 83 | O | X |
| 3 | 1.563 | 4H | Yellow | 84 | O | Δ~O |
| 4 | 1.490 | H | Colorless | 91 | X | O |

COMPARATIVE EXAMPLE 4

A lens was injection molded from commercial polymethyl methacrylate. The evaluation results of performance characteristics of the lens are shown in Table 2.

TABLE 2

| Comparative Example No. | Refractive index | Hardness | Color | Visible light transmission | Grinding processability | Dyeability |
|---|---|---|---|---|---|---|
| 1 | 1.500 | 2H | Colorless | 91 | O | O |
| 2 | 1.549 | 3H | Yellow | 83 | O | X |

TABLE 2-continued

| Comparative Example No. | Refractive index | Hardness | Color | Visible light transmission | Grinding processability | Dyeability |
|---|---|---|---|---|---|---|
| 3 | 1.563 | 4H | Yellow | 84 | O | Δ~O |
| 4 | 1.490 | H | Colorless | 91 | X | O |

EXAMPLE 10

The specific gravities of the lenses obtained in Examples 1 to 9 and Comparative Examples 1 to 4 were measured and their specific refractive indices (values obtained by dividing refractive index by specific gravity) were calulated. Further, the lenses were tested according to FDA Standards. The results obtained are shown in Table 3. Specific refractive index is a value indicating, the degree of lightness of the lense.

TABLE 3

| | Refractive index | Specific gravity | Specific refractive index | Impact resistance |
|---|---|---|---|---|
| Example | | | | |
| 1 | 1.603 | 1.23 | 1.303 | Eligible |
| 2 | 1.601 | 1.23 | 1.302 | " |
| 3 | 1.604 | 1.23 | 1.304 | " |
| 4 | 1.562 | 1.27 | 1.230 | " |
| 5 | 1.583 | 1.25 | 1.266 | " |
| 6 | 1.586 | 1.22 | 1.280 | " |
| 7 | 1.595 | 1.23 | 1.295 | " |
| 8 | 1.592 | 1.23 | 1.294 | " |
| 9 | 1.584 | 1.23 | 1.288 | " |
| Comparative Example | | | | |
| 1 | 1.500 | 1.32 | 1.136 | " |
| 2 | 1.549 | 1.23 | 1.259 | Ineligible |
| 3 | 1.563 | 1.39 | 1.124 | " |
| 4 | 1.490 | 1.20 | 1.241 | " |

*Tested on a lens having a central thickness of 2 mm.

What is claimed is:

1. A plastic lens which comprises a polymer (A) containing as major component one or more radicalpolymerizable biphenyl compounds represented by the general formula [I]:

$$CH_2=C(R)-CH_2-O-C(=O)-[biphenyl]-C(=O)-O-CH_2-C(R)=CH_2 \quad [I]$$

wherein each of R's represents a hydrogen atom or methyl group, and has a refractive index of not less than 1.55.

2. A plastic lens according to claim 1, wherein the polymer (A) contains not less than 60% by weight of the radical-polymerizable biphenyl compound or compounds represented by the general formula [I].

3. A plastic lens according to claim 1, wherein the polymer (A) is a copolymer of at least one radical-polymerizable biphenyl compound represented by the general formula [I] and at least one member selected from the group [II] consisting of diethylene glycol bis(allylcarbonate) and dimethallyl phthallate.

4. A plastic lens according to claim 1, wherein the polymer (A) is a copolymer comprising not more than 90% by weight and not less than 60% by weight of at least one radical-polymerizable biphenyl compound represented by the general formula [I] and not more than 40% by weight and not less than 10% by weight of at least one member selected from the group [II] consisting of diethylene glycol bis(allylcarbonate) and dimethallyl phthalate.

* * * * *